(12) United States Patent
Wiseman

(10) Patent No.: US 12,277,607 B2
(45) Date of Patent: Apr. 15, 2025

(54) TRANSACTION MANAGEMENT SYSTEM FOR MANAGING TRANSACTIONS BEING WRITTEN TO STORAGE

(71) Applicant: Goldman Sachs & Co. LLC, New York, NY (US)

(72) Inventor: Bella Wiseman, New York, NY (US)

(73) Assignee: Goldman Sachs & Co. LLC, New York, NY (US)

( * ) Notice: Subject to any disclaimer, the term of this patent is extended or adjusted under 35 U.S.C. 154(b) by 211 days.

(21) Appl. No.: 18/081,649

(22) Filed: Dec. 14, 2022

(65) Prior Publication Data

US 2024/0202835 A1    Jun. 20, 2024

(51) Int. Cl.
*G06Q 40/12* (2023.01)
(52) U.S. Cl.
CPC .................................... *G06Q 40/12* (2013.12)
(58) Field of Classification Search
CPC ..................................................... G06Q 40/12
See application file for complete search history.

(56) References Cited

U.S. PATENT DOCUMENTS

| | | | |
|---|---|---|---|
| 10,496,630 B2 | 12/2019 | Couckuyt et al. | |
| 10,942,823 B2 | 3/2021 | Pardon | |
| 2014/0258226 A1 | 9/2014 | Noteboom | |
| 2016/0344834 A1* | 11/2016 | Das | H04L 67/1097 |
| 2021/0294645 A1* | 9/2021 | Agrawal | G06F 9/5072 |
| 2021/0374283 A1* | 12/2021 | Kunjachan | G06Q 20/3827 |

FOREIGN PATENT DOCUMENTS

CN    108140043 B    5/2022

OTHER PUBLICATIONS

PCT International Search Report and Written Opinion, PCT Application No. PCT/IB2023/062371, Mar. 18, 2024, 8 pages.
Wikipedia, "Lamport Timestamp," Apr. 18, 2023, 4 pages, [Online] [Retrieved on Jun. 7, 2023] Retrieved from the Internet URL: <https://en.wikipedia.org/wiki/Lamport_timestamp>.

* cited by examiner

*Primary Examiner* — Fahd A Obeid
*Assistant Examiner* — Reva R Moore
(74) *Attorney, Agent, or Firm* — Fenwick & West LLP

(57) ABSTRACT

A transaction management system manages transactions in a system environment by receiving and recording transaction records and generating a transaction report for a monitoring system. Reporting devices execute transactions within the environment and transmit transaction records describing those transactions to the transaction management system. The transaction management system receives the transaction records and records them to persistent memory. In doing so, the transaction management system is configured to generate an accurate transaction report for the transactions while the transaction reports are being written to persistent memory. To do so, the transaction management system generates a horizon time for reporting transaction records based on the transaction records recordation state and ingest time.

18 Claims, 5 Drawing Sheets

TRANSACTION MANAGEMENT SYSTEM FOR MANAGING TRANSACTIONS BEING WRITTEN TO STORAGE

FIELD OF DISCLOSURE

This disclosure relates generally to accounting for transaction records within a transaction management system, and, in particular, accounting for transaction records as they are being written into a persistent data store.

BACKGROUND

Transaction management systems are oftentimes required to produce wholly accurate accountings of transactions occurring within their system environment. To do so, the transaction management system typically generates a transaction report providing details of transactions that have occurred within the environment to a monitoring system. Traditional transaction management systems use simplistic methods to account for these transaction that can lead to errors when the transaction report is generated when transaction records are being written to memory (rather than persisted in memory). As the density of transactions in the system environments of transaction management systems increases, so too does the frequency of errors in transaction reports. As such, systems and methods are needed to accurately account for transaction records as they are executed within a system environment are needed.

SUMMARY

Reporting devices execute transactions in a system environment. A transaction management system manages transactions and records of those transactions within the system environment, and provides an accounting of those transactions to a monitoring system via a transaction report.

To generate an accurate accounting of transactions while they are being written to a persistent data storage, the transaction management system identifies a horizon time for the transaction report. The horizon time allows all transactions with transaction metadata indicating they were created before the horizon time to be reported in a transaction report, while allowing transactions with transaction metadata indicating they were created after the horizon time to be reported in a subsequent report. Generation of the horizon time is based on the recordation state of the transactions and their creation (or ingest, or transmission) time. The transaction management system generates and transmits a transaction report to a monitoring system based on the horizon time.

To illustrate, in an example embodiment, a transaction management system is configured to generate a transaction report while transaction are being written to a persistent data storage. The transaction management system performs a method to do so. Within the method, the transaction management system stores transactions continuously received from reporting devices. The transactions are associated with transaction metadata describing their corresponding transaction. The transaction metadata describes, for example, executed transaction and their state. For instance, the transaction metadata for each transaction record may identify a recordation state describing the transactions as either writing to memory or persisted in memory, and a creation time quantifying when the transaction was executed.

The transaction management system selects a first subset of transactions having transaction metadata identifying the selected transaction as writing to storage. The transaction management system identifies a horizon time quantifying a lowest ingest time in the first subset of transactions less a threshold time.

The transaction management system selects, from the plurality of transactions, a second subset of transaction shaving transaction metadata identifying each transaction as persisted in storage and transaction metadata identifying the creation time of the transaction as being before the horizon time. The transaction management system transmits a transaction report including the second subset of transactions to a monitoring system.

Figure 1:
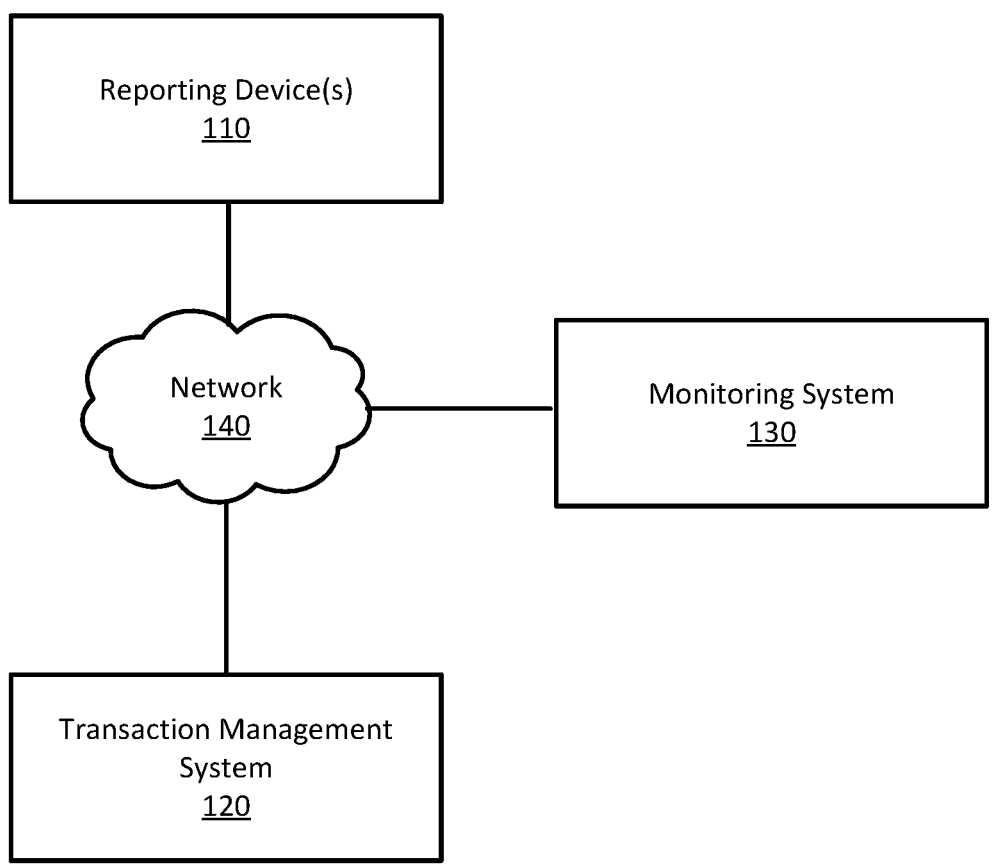
FIG. 1 illustrates a system environment for a transaction management system, according to one example.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Introduction

Transactions within a system environment are often monitored by a monitoring system. Transaction management systems account for transactions in a system environment after recording those transactions to a persistent data store, and the transaction management system reports recorded transactions to a monitoring system.

Traditional transaction management systems manage transactions in a style like customers at a butcher shop—assigning a number to each transaction on arrival and processing the transactions from lowest to highest number. While this system provides a simple method to account for transactions within the system environment, it ignores complexities of modern system environments. As a result, accurate accounting of transactions is difficult and error prone.

Specifically, the "first-in, first-out" accounting systems of traditional transaction management systems are unable to provide accurate accounting of transactions when their records are being written to a persistent storage. To illustrate, consider a transaction management system that receives a first transaction and a second transaction. The first transaction record is very large due to the complexities of the transaction, while the second transaction record is very small due to its simplicity. The transaction management system begins recording the first transaction and the second transaction to a persistent data storage at approximately the same time. The second transaction records quickly because it is small, while the first transaction records take some time because it is large.

At these moments, where a transaction is "in-flight" being written to persistent data storage, a traditional transaction management system may not accurately account for those in-flight transactions within the system. For instance, consider again the above example with two transaction records. In this case, if the transaction management system were to query which transactions were recorded based on what has been persisted in storage it would not accurately represent transactions in the system. This is, in this example, the transaction management system would account for the second transaction (because it is recorded to memory) but not the first transaction (because it is not recorded to memory) even though both have been "processed" by the transaction management system. As such, any accounting of transactions processed by the transaction management system, and thereby any reports generated for a monitoring system, would be inaccurate.

Presented herein are systems and methods that provide for monitoring the recording of transactions while they are being written to a persistent data storage in order to accurately account for all transactions within a system environment.

System Environment for Transaction Management

FIG. 1 illustrates a system environment for a transaction management system, according to one example. The system environment ("environment") 100 includes a reporting device 110 (or devices), a transaction management system 120, and a monitoring system 130 communicating over a network 140. Systems and devices within the environment 100 are configured to monitor and verify the fidelity and accuracy of transactions occurring within the environment 100 using their transaction records.

A transaction is data representing an interaction between two devices within the environment 100. For instance, a transaction may represent an interaction between a reporting device 110 and a third-party device (not illustrated), two reporting devices 110, a reporting device 110 and the transaction management system 120, etc. Transactions are recorded to persistent data storage. Data in a transaction may include, for example, the parties in a transaction, information describing each party in the transaction (e.g., location, institution information etc.), details of the transaction (e.g., records, item or service in the transaction, etc.), information exchanged in the transaction, or any other relevant information for the transaction record.

Each transaction is associated with transaction metadata. Transaction metadata describes the state and previous states of transactions within the environment 100. Transaction metadata may describe, for example, receiving devices, transmitting devices, a time of transmission, a time of receipt, associated record size, a writing state, etc. For convenience, transactions and their associated transaction metadata may be described as transaction information herein. In other words, transaction information includes data describing a transaction and its corresponding transaction metadata. Transaction information may be edited or added to, as described hereinbelow.

A reporting device 110 is a computing device capable of generating, executing, assessing or otherwise performing a transaction within the environment 100. Reporting devices 110 also generate transaction metadata describing executed transactions. In other words, reporting devices generate transaction information within the environment 100.

To illustrate, in an example embodiment, the reporting device 110 is a laptop computer configured to complete a transaction using an online web-portal, and the reporting device 110 executes a transaction and its corresponding transaction metadata. In other examples, a reporting device 110 may be a device having computer functionality, such as a server, a personal computer, a personal digital assistant (PDA), a mobile telephone, a smartphone or another suitable device. The reporting device 110 is additionally configured to communicate with the transaction management system 120 via the network 140. For example, in an embodiment, the reporting device 110 may be a network system configured to communicate with the transaction management system 120 via the internet.

The transaction management system 120 is a network system configured to manage transactions within the environment 100. Managing transactions includes at least four aspects: recording transactions to a persistent data store within the environment 100, managing transaction metadata for transactions in the environment 100, generating a transaction report for a monitoring system 130, and executing transactions (if necessary). Details of these aspects are described in greater detail below in relation to FIG. 2.

The monitoring system 130 is configured to receive transaction information from the transaction management system 120. As described above, the monitoring system 130 may be a system designed to monitor and verify the fidelity, legitimacy, and accuracy of transactions within the environment 100 ("regulation activity"). The monitoring system 130 may base its regulation activity on an accurate accounting of transactions within the environment 100. As such, the transaction management system 120 may generate a transaction report sufficient for the regulation activity based on transactions and transaction metadata it receives within the environment 100.

The network 140 comprises any combination of local area and/or wide area networks, using both wired and/or wireless communication systems. The network 140 may employ various communications technologies and/or protocols. For example, the network 140 may utilize communication technologies such as Ethernet, 802.11, 3G, 4G, digital subscriber line (DSL), etc. The network 140 may also employ network 140 protocols for communicating information via the network 140. Some example protocols may include transmission control protocol/Internet protocol (TCP/IP), hypertext transport protocol (HTTP), simple mail transfer protocol (SMTP), file transfer protocol (FTP), etc. Data exchanged over the network 140 may be represented using any suitable format, such as hypertext markup language (HTML) or extensible markup language (XML). In some embodiments, all or some of the communication links of the network 140 may be encrypted using any suitable technique or techniques.

The environment 100 may take other configurations. To illustrate, in an example embodiment, the transaction management system 120 may be implemented on a reporting device 110 rather than on a network system connected to the reporting device 110 via the network 140. In another example, the transaction management system 120 may be a standalone program on a reporting device 110. In this case, the transaction management system 120 may store transactions as they occur and generate transaction records for the reporting device 110 on which it is installed, rather than for all reporting devices 110 within the environment 100. In another example embodiment, the transaction management system 120 may be implemented as a network 140 system accessible through an application executing on the reporting device 110. In this case, multiple reporting devices 110 (not illustrated) may connect to the transaction management system 120 to provide transaction records. In still another example embodiment, the transaction management system 120 may utilize and API built into the reporting device 110 which automatically transmits transaction records to the transaction management system 120 when they are executed on a reporting device 110. In a final example embodiment, a transaction management system 120 may be configured for monitoring transaction metadata and generating a transaction report, and the reporting device 110 may be configured for recording transactions to a local persistent data store.

Transaction Management System

Figure 2:
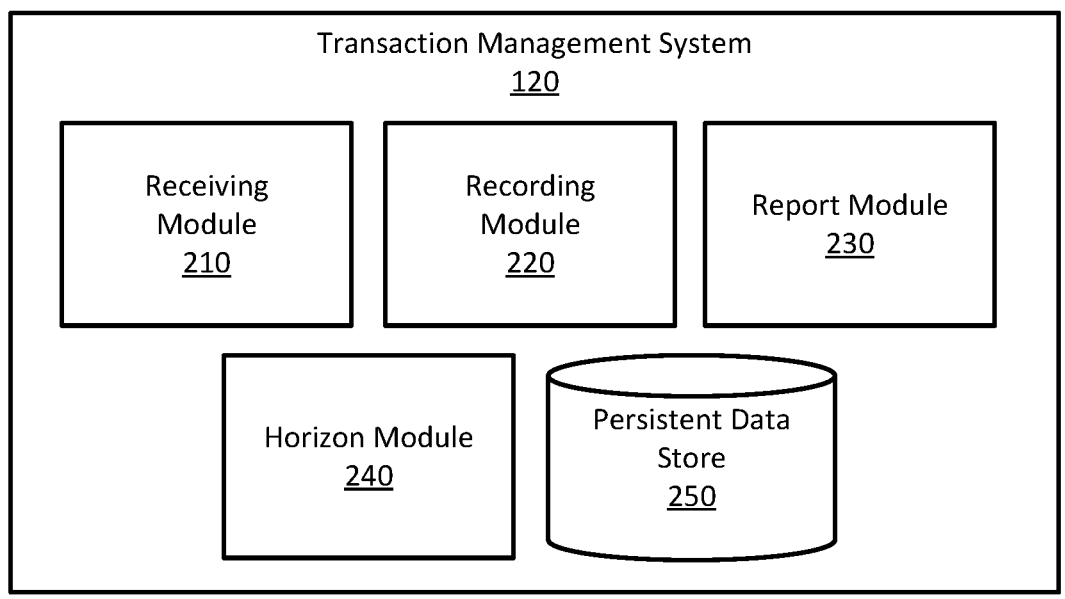
FIG. 2 is a block diagram illustrating a transaction management system, according to one embodiment.

FIG. 2 is a block diagram illustrating a transaction management system, according to one example embodiment. As shown in FIG. 2, the transaction management system 120 includes a receiving module 210, a recording module 220, a horizon module 240, a report module 230, and a persistent data store 250. Other embodiments of the transaction management system 120 may include fewer, additional, or different modules, and the functionality may be distributed differently between the modules.

As described above, the transaction management system 120 is configured for receiving and recording transactions, managing transaction metadata associated with transactions, generating a transaction report for a monitoring system 130, and executing transactions.

Figure 3:
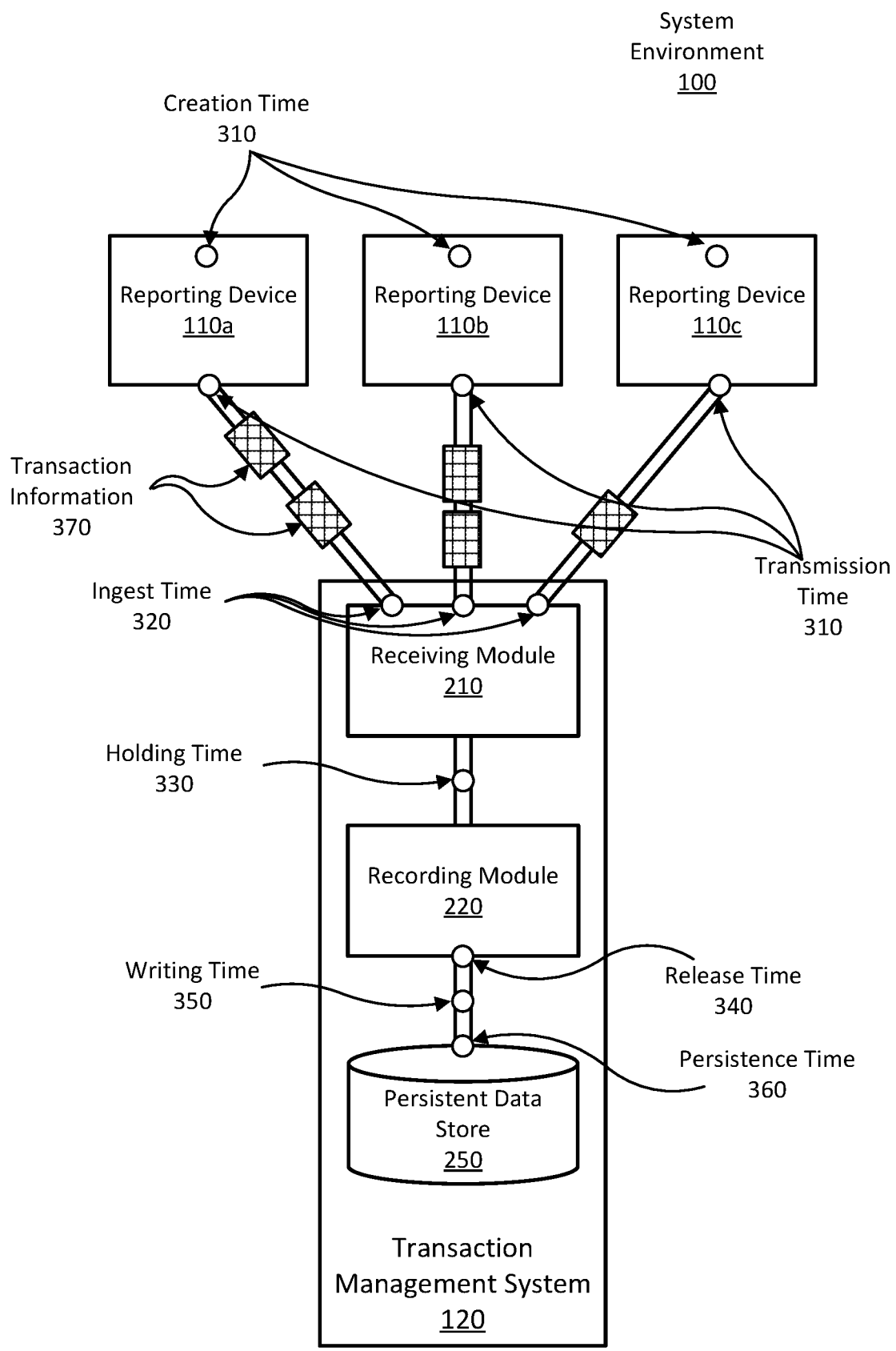
FIG. 3 illustrates the environment of the transaction management system and several relevant time points, according to one example embodiment.

Before an in-depth discussion of functionality of these modules, however, the description turns to FIG. 3 to establish relevant nomenclature within the environment 100. FIG. 3 illustrates the environment of the transaction management system and several relevant time points, according to one example embodiment. As illustrated, the environment 100 includes reporting devices 110 (e.g., 110a, 110b, and 110c). Each reporting device 110 is performing transactions in the environment 100 and generates transaction information 370 (e.g., transaction records and their associated metadata) describing those transactions. A reporting device 110 transmits transaction information 370 to the transaction management system 120 via the network (not shown). The transaction management system 120 manages the transaction information 370, including receipt and recordation of transaction records and management of metadata associated with those transaction records.

Within the environment 100, metadata associated with a transaction record may include:

The creation time 300 is a time quantifying when the reporting device executes the transaction in the environment.

The transmission time 310 is a time quantifying when the reporting device 110 transmits transaction information 370 to the transaction management system 120.

The ingest time 320 is a time quantifying when the transaction management system 120 receives transaction information 370 from the reporting device 110.

The holding time 330 is an amount of time quantifying how long the transaction management system 120 holds a transaction before recording it to a persistent data store 250.

The release time 340 is a time quantifying when the recording module 120 begins writing a transaction to a persistent data store 250.

The writing time 350 is an amount of time quantifying how much time it takes the recording module 120 to record a transaction to a persistent data store 250.

The persistence time 360 is a time quantifying when a transaction record 300 is completely recorded to the persistent data store 250 (e.g., the recording module 220 completes writing the transaction record to the persistent data store 250).

Returning now to FIG. 2, the receiving module 210 is configured to receive transaction information 370 (e.g., transactions and their associated transaction metadata) from reporting devices 110. To illustrate, a reporting device 110 executes a transaction and generates its associated transaction metadata at a creation time 300. The reporting device 110 transmits the transaction and/or transaction metadata as transaction information 370 to the transaction management system 120. The time the reporting device 100 transmits the transaction information 370 is the transmission time 310.

The receiving module 210 receives the transaction information 370 from the reporting device 110 at the ingest time 320. Typically, the receiving module 210 receives transaction information 370 at an ingest time after the reporting devices 110 transmits the transaction record at the transmission time 310. The receiving module 210 may add the ingest time 320 and/or the transmission time 310 to the transaction information 370 (e.g., by amending or editing the transmission metadata) such that the times may be used in accurate transaction record accounting, as needed. Notably, in embodiments where transactions are recorded to a persistent data store 250 on a reporting device 110 (not illustrated), there may not be a transmission time or an ingest time.

The recording module 220 is configured to record transactions from the transaction information 370 to the persistent data store 250. As described above, recording transaction records to a persistent data store 250 may take a non-insignificant amount of time that may cause problems in transaction report generation in a traditional system transaction management system.

Within this context, the recording module 220 manages a transaction through three recording states: a release state, a writing state, and a persistence state. In the release state, the recording module 220 has released the transaction for recording to the persistent data storage 250. The release state begins at the release time 340. In the writing state, the recording module 220 records (e.g., writes) a transaction to the persistent data store 250. The transaction is in the writing state for the writing time 350. In the persistent state, the transaction record is stored in the persistent data store 250 because recording module 220 has completed recording the transaction. The persistence state begins at the persistence time 360.

As the recording module 220 manages transactions through each recording state, the recording module 220 may modify the transaction metadata associated with the transaction to indicate the current recording state. For example, the recording module may add modify the transaction metadata to indicate a particular transaction is in the writing state and may modify the transaction metadata to indicate the transaction record 300 is in the persistent state once the recording module 220 completes the recordation process for that transaction. Similarly, the recording module 220 may modify the transaction metadata describing the various pertinent times for each transaction record 300 within the environment (e.g., ingest, writing, etc.).

The report module 230 is configured to generate a transaction report. A transaction report is a report providing an accurate accounting of every transaction record received at the transaction management system 120. The transaction report may be generated according to the regulation activities of the monitoring system 130. The report module 230 may generate a transaction report at, e.g., predefined intervals, after a threshold number of transaction records have been recorded and/or received, at a request of an administrator of the transaction management system 120, after receiving a request from the monitoring system 130, etc. Once generated, the report module 230 transmits the report to the monitoring system 130.

As described above, accurately monitoring transactions as they are executed, written to storage, and persisted to storage is error prone. This is especially true in instances where a traditional transaction management system seeks to account for transactions while some of the transactions are being written to a persistent storage. Correspondingly, generating an accurate transaction report may also be error prone because the generated report may not be able to account for the various states a transaction record is in.

To overcome this problem, the transaction management system 120 includes a horizon module 240 configured to determine a horizon time for transaction reports. The horizon time is a point in time before which all transactions will be included in a first time-window. After the horizon time, all transaction records will be included in a second time-window, which may in turn have its own horizon time. Due to the configuration of the horizon time, each and every report will be included in only one time-window, regardless of when it is ingested, released, written, and persisted.

The time-window may be used to generate transaction reports. For example, a first transaction report may include transaction records in the first time-window, and a second transaction report may include transaction records in the second time-window. In this manner, a series of transaction reports are generated which, in aggregate, comprise the transaction records for every transaction within the environment 100. Due to the horizon time system, each and every transaction record is included in only one transaction report, regardless of when it is ingested, released, written, and persisted.

To generate a horizon time, the horizon module 240 receives a request to generate a first time-window at a request time. In this example, the first time-window represents a time-window for a transaction report. At the request time, the horizon module 240 analyzes transaction metadata within the environment 100 to identify those transactions in the writing state and places the identified transaction records into a first group of transactions. The horizon module 240 identifies a lower time boundary of the transactions based on the transaction metadata and sets the lower time boundary as the horizon time. The lower time boundary may be an ingest time or a creation time (or some other relevant time). As an example, the horizon time may be a lowest creation time of the various creation times for transactions in a group of transaction, or may be a lowest ingest time of the various ingest times for transactions in a group of transactions.

In some embodiments, the horizon time may be modified. For example, in some embodiments, the horizon time may be the lowest creation time of the transaction records in the first group less (i.e., before) a time quantity (e.g., 1 minute, 5 minutes, etc.). All the transaction records having metadata reflecting it was received before the horizon time are placed in the first time-window.

The report module 230 generates a transaction report based on the determined horizon time. To do so, the report module 230 identifies all transaction records in the persisted state and having an ingest time less than the horizon time and includes those transaction records in first group of transaction records. The report module 230 generates a transaction report describing all the transactions corresponding to the transaction records in the second group. The transaction report typically includes at least some of the information included in the transaction records of the associated transactions.

The report module 230 may be configured to generate reports such that each transaction is included in a report only once. That is, once reported in a transaction report, a specific transaction will not again appear in another transaction report. To do so, in a first example, the horizon module 240 may set the start time for a second time window as the horizon time of a first, previous time window. In this way, each transaction will only be reported one time.

Finally, the transaction management system 120 is configured for executing a transaction within the environment 100. The transaction management system 120 may execute a transaction by interacting with a reporting device 110, a third-party device, another network system, etc. In another configuration, the transaction management system 120 may receive an instruction, e.g., from a reporting device 110 or a third-party device, to execute a transaction and do so in response. In whatever case, transactions executed by the transaction management system 120 also generate transaction records which the transaction management receives and records.

EXAMPLE IMPLEMENTATION

Figure 4:
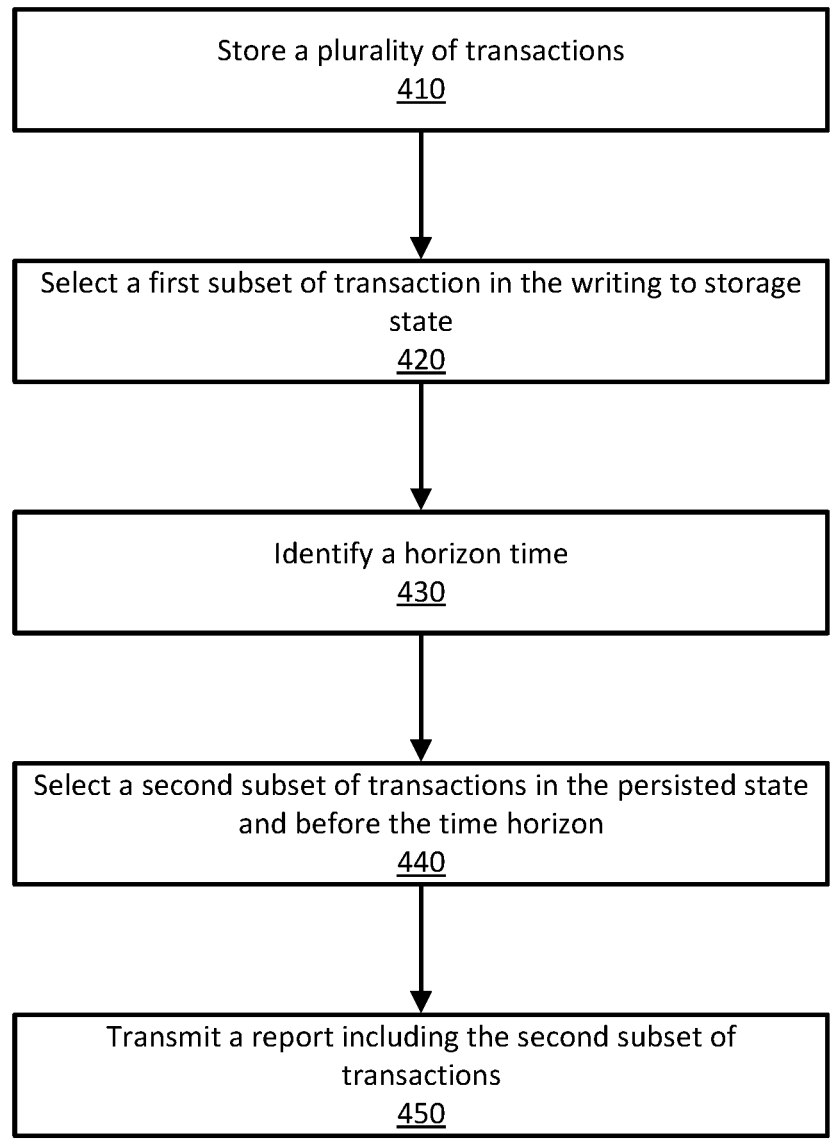
FIG. 4 illustrates a process flow for recording transaction records to persistent memory and generating a transaction report, according to one example embodiment.

FIG. 4 illustrates a process flow for recording transactions to a persistent data store and generating a transaction report, according to one example embodiment. The process flow may be implemented in an environment similar to the environment described in FIG. 1 but could be implemented in a different environment. The process includes several steps for recording records and generating a report, but, in various other embodiments, the process could include additional or fewer steps. Further the steps may occur in any order and any of the steps may be repeated as necessary.

Various reporting devices (e.g., reporting device 110) are executing transactions in a system environment (e.g., system environment 100). The reporting devices may be employing a transaction management system (e.g., transaction management system 120) to execute the transactions or may be performing their transactions locally. The transaction management system is configured record executed transactions and generate a transaction report for a monitoring system (e.g., monitoring system 130) according to its regulation activities. The transaction report provides the monitoring system a record of transactions executed within the system environment with complete fidelity.

The transaction management system stores 410 (or receives, or accesses) transactions and their associated transaction metadata as they are executed by reporting devices (or the transaction management system) within the system environment. Storing transaction can include storing the data associated with transaction at the transaction management system.

The transaction metadata includes information that assist in accurately accounting for transactions while the records are being written to a persistent memory. In one aspect, the metadata includes tags describing a transaction record's state in the recordation process ("recordation state"). For example, a transaction record may be labelled with: (1) the writing state, if the transaction is being written to persistent storage (e.g., persistent data store 250), or (2) the persisted state, if the transaction has been completely written to persistent storage. The transaction may be otherwise labelled with a different state as described herein above. In an additional aspect, the transaction metadata may also describe various times that events in the recordation process occurred. For example, the metadata may include any of a creation time, a transmission time, an ingest time, a holding time, a release time, a writing time, and/or a persistence time.

The transaction management system selects 420 a first subset of transactions from the stored transaction records. To do so, the transaction management system identifies and selects transactions having transaction metadata indicating the writing state, and selects those transactions as the first subset of transactions.

The transaction management system identifies 430 a horizon time. To do so, the transaction management analyzes transaction metadata associated with transaction in the first subset of transactions (or the transaction data itself) to identify the lowest creation (or ingest, or transmission) time. The transaction management system selects the lowest creation (or ingest, or transmission) time less a threshold time as the horizon time. The threshold time may be, e.g., 30 seconds, 1 minute, 2 minutes, etc.

The transaction management system selects 440 a second subset of transactions. To do so, the transaction management system identifies and selects transaction meeting two criteria: (1) the transaction is associated with transaction metadata indicating it is in a persisted state, and (2) the transaction is associated with transaction metadata indicating it has an creation time before the horizon time. In some cases, by satisfying either condition (1) or (2), the other condition is necessarily satisfied. That is, if the transaction metadata indicates the transaction is persisted to memory, it must have a creation (or ingest, or transmission) time before the horizon time, or vice versa. The record selection module selects transaction records meeting first and second criteria (or only the first, or only the second) for the second subset of transactions.

The transaction management system generates a report including the second subset of transactions. Broadly, the transaction report provides an accounting of, and all relevant information relating to, the transactions included in the second subset of transaction records. Once generated, the transaction management system transmits 450 the report to a monitoring system (e.g., monitoring system 130). In some examples, the transaction management system transmits the report to the monitoring system in response to receiving a request for the transaction report from the monitoring system.

Additional Configuration Considerations

In some example configurations, the transaction management system 120 may include one or more additional persistent data stores 250, and therefore may record different transactions to each persistent data store 250. Moreover, each persistent data store 250 may have different characteristics (e.g., capacity, write-speed, read-speed, security, etc.). As such, the transaction management system 120 may select which persistent data store 250 in which to record transactions based on those characteristics. For instance, the transaction management system 120 may select a persistent data store 250 with high write-speeds for writing large-size transactions to reduce their writing times.

In some example configurations, the receiving module 210 may hold a transaction for a holding time before the recording module 220 releases the transaction for recording to the persistent data storage 250 (e.g., a transaction record in a holding state). Holding transactions allows the receiving module 210 to manage recording transaction more acutely. For instance, holding transaction may allow the transaction management system 120 to group sets of transaction having similar characteristics for release by the recording module 120 at the same time. As an example, the receiving module 210 may hold transactions and group transaction records for various transactions that have similar sizes (e.g., data), similar parties, ingest times, etc. Similarly, holding transactions may allow the transaction management system 120 to allot transactions to different persistent data stores 250 based on, e.g., the storage capacity of the persistent data store 250, the types of transactions stored in the persistent data store 250, etc.

The transaction management system 120 may be configured to process transactions in batches. Herein, a batch of transactions is a group of one or more transaction records the same state. For instance, a batch of transaction may be labelled such that their associated transaction metadata describes them in the writing state when the recording module 220 is writing the transactions in the batch to the persistent data store 250, the holding state when the receiving module 210 is holding the transactions, etc. Because batches of transactions have the same recording state, the included transaction may be processed more efficiently (because the transaction management system 120 does not have to look at every transaction or their associated transaction metadata in a batch). Each batch of transaction records may be assigned for writing to different persistent data stores 250.

To illustrate, consider an example where a transaction management system 120 comprises four batches of transaction records: Batch A, Batch B, Batch C, and Batch D. Batch A is in the holding state, Batch B is in the writing state, Batch C is in the writing state, and Batch D is in the persisted state. Of note, Batch B includes several transaction records, each of which are still in the process of being written. Batch C includes several transaction records, some of which have completed writing to the persistent data storage and some of which have not. Batch C is still in the writing state because not all its transaction records have been persisted. Accordingly, when generating reports, the transaction management system need not look to individual transaction records to determine their state, as it can determine their relevant state from the state of their corresponding batch.

Additionally, the monitoring system 130 is configured to continuously monitor transactions executing within the environment. That is, as reporting devices 110 continuously execute transactions and generate transaction metadata for those transaction. The reporting devices continuously transmit the corresponding transactions and transaction metadata to the transaction management system 120. The transaction management system 120 continuously writes the transaction records to a persistent storage 250. The monitoring system 130 may also continuously receive transaction reports from the transaction management system 120 describing transactions executed within the environment 100.

The transaction management system 120 may generate and transmit transactions reports based on a variety of criteria. For instance, the transaction management 120 system may generate and/or transmit a transaction report after receiving a request from the monitoring system, the transaction management receives a threshold number of transaction records, a threshold amount of time passing since the transaction management system generated a previous transaction report, and a predefined time occurring (e.g., at 12:00 PM Pacific).

Computer System

Figure 5:
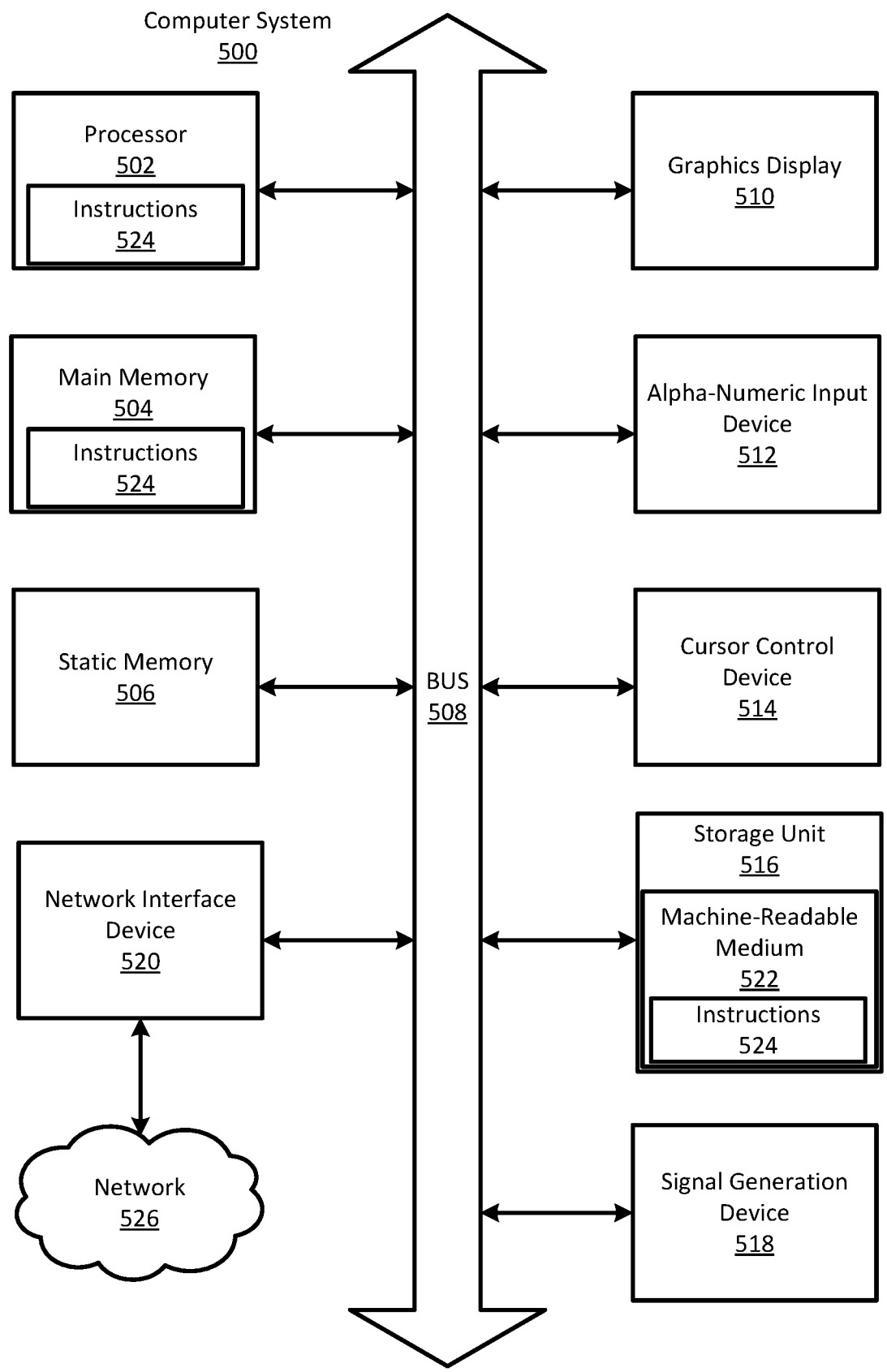
FIG. 5 illustrates a block diagram representing a computer system, according to one example embodiment.

FIG. 5 illustrates a block diagram representing a computer system, according to one example embodiment. Specifically, FIG. 5 shows a transaction management system 120, a reporting device 110, and/or a monitoring system 130 in the example form of a computer system 500. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client system environment 100 (e.g., environment 100), or as a peer machine in a peer-to-peer (or distributed) system environment 100.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504, and the storage unit 516 communicate via a bus 508.

In addition, the computer system 500 can include a static memory 506, a graphics display 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. For example, the instructions 524 may include the functionalities of modules of the system 140 described in FIG. 1. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 (e.g., network 140) via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the disclosure may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the invention.

What is claimed is:

1. A method for identifying transactions stored before a horizon time, the method comprising:
    storing, at a transaction management system as transactions are continuously executed, data for each of a plurality of transactions, each transaction of the plurality associated with transaction metadata describing a state of the transaction, the transaction metadata identifying:

a recordation state describing whether the transaction is writing to memory or persisted in memory, wherein writing to memory indicates the transaction management system is currently writing data for the transaction to a persistent memory and persisted in memory indicates the transaction management system has completed writing the transaction to a persistent memory, and a creation time quantifying when the transaction was executed;

selecting, from the plurality of transactions, a first subset of transactions having transaction metadata identifying the selected transactions as writing to memory;

identifying a horizon time quantifying a lowest creation time in the first subset of transactions less a threshold time;

selecting, from the plurality of transactions, a second subset of transactions having transaction metadata identifying the transactions as persisted in memory and transaction metadata identifying the creation time of the transactions as being before the horizon time; and in response to receiving a request for a transaction report from a monitoring system, transmitting the transaction report including data for the second subset of transactions to the monitoring system.

2. The method of claim 1, further comprising:
receiving the plurality of transactions from a plurality of reporting devices continuously executing transactions, each of the received transactions of the plurality describing one of the executed transactions.

3. The method of claim 1, wherein the transaction report is configured to provide an accounting of a plurality of executed transactions based on the transactions.

4. The method of claim 3, wherein the transaction report provides the accounting according to regulation principles of the monitoring system.

5. The method of claim 1, wherein the transaction management system stores the plurality of transactions as a plurality of transaction batches, each of the plurality of transaction batches comprising a group of the plurality of transactions.

6. The method of claim 1, wherein the transaction metadata identifying the recordation state is configured for identifying a batch of transactions as having a same recordation state.

7. The method of claim 1, further comprising holding received transactions for a holding time before writing the transactions to a persistent memory.

8. The method of claim 1, further comprising generating, using the transaction management system, the transaction report including the second subset of transactions, wherein the transaction management system generates the transaction report in response to any of:
a request received from the monitoring system,
the transaction management system receiving a threshold number of transactions,
a threshold amount of time passing since the transaction management system generates a previous transaction report, and
a predefined time occurring.

9. The method of claim 1, further comprising writing each transaction of the plurality of transactions to a persistent memory.

10. A system comprising:
a plurality of devices configured to execute transactions and generate transaction metadata describing the executed transactions;

a transaction management system configured to receive generated transactions and a transmit a transaction report, the transaction management system configured to transmit the transaction report by:
storing, as transactions are continuously executed, data for each of a plurality of transactions executed by the plurality of devices, each transaction of the plurality associated with transaction metadata describing a state of the transaction, the transaction metadata identifying:
a recordation state describing whether the transaction is writing to memory or persisted in memory, wherein writing to memory indicates the transaction management system is currently writing data for the transaction to a persistent memory and persisted in memory indicates the transaction management system has completed writing the transaction to a persistent memory, and
a creation time quantifying when the transaction was executed,
selecting, from the plurality of transactions, a first subset of transactions having transaction metadata identifying the selected transactions as writing to storage,
identifying a horizon time quantifying a lowest creation time in the first subset of transactions less a threshold time;
selecting, from the plurality of transactions, a second subset of transactions having transaction metadata identifying the transactions as persisted in storage and transaction metadata identifying the creation time of the transactions as being before the horizon time, and
in response to receiving a request for a transaction report from a monitoring system, transmitting the transaction report including data for the second subset of transactions to the monitoring system, and
a monitoring system configured to receive the generated transaction report.

11. The system of claim 10, wherein a recordation state identifying a transaction as writing to memory indicates the transaction management system is currently writing the transaction to a persistent memory.

12. The system of claim 10, wherein a recordation state identifying a transaction as persisted in memory indicates the transaction management system has completed writing the transaction to a persistent memory.

13. The system of claim 10 wherein the transaction management system is configured to generate the transaction report which provides an accounting of executed transactions based on the transactions.

14. The system of claim 13, wherein the accounting in the transaction report is generated according to regulation principles of the monitoring system.

15. The system of claim 10, wherein the transaction management system stores the plurality of transactions as a plurality of transaction batches, each of the plurality of transaction batches comprising a subset of the plurality of transactions.

16. The system of claim 10, wherein the transaction metadata identifying the recordation state is configured for identifying a batch of transactions as having a same recordation state.

17. The system of claim 10, wherein the transaction management system is further configured to generate the transaction report in response to any one of:
a request received from the monitoring system;

the transaction management system receiving a threshold number of transactions;
a threshold amount of time passing since the transaction management system generates a previous transaction report; and
a predefined time occurring.

18. A non-transitory computer-readable storage medium comprising computer program instructions for identifying transactions stored before a horizon time, the computer program instructions, when executed by one or more processors, causing the one or more processors to:
store, at a transaction management system as transactions are continuously executed, data for each of a plurality of transactions, each transaction of the plurality associated with transaction metadata describing a state of the transaction, the transaction metadata identifying:
a recordation state describing whether the transaction is writing to memory or persisted in memory, wherein writing to memory indicates the transaction management system is currently writing data for the transaction to a persistent memory and persisted in memory indicates the transaction management system has completed writing the transaction to a persistent memory, and
a creation time quantifying when the transaction was executed;
select, from the plurality of transactions, a first subset of transactions having transaction metadata identifying the selected transactions as writing to memory;
identify a horizon time quantifying a lowest creation time in the first subset of transactions less a threshold time;
select, from the plurality of transactions, a second subset of transactions having transaction metadata identifying the transactions as persisted in memory and transaction metadata identifying the creation time of the transactions as being before the horizon time; and
in response to receiving a request for a transaction report from a monitoring system, transmit the transaction report including data for the second subset of transactions to the monitoring system.

* * * * *